(12) United States Patent
Lee et al.

(10) Patent No.: US 11,681,182 B2
(45) Date of Patent: Jun. 20, 2023

(54) CIRCUIT BOARD FOR LIGHT-EMITTING DIODE ASSEMBLY, BACKLIGHT UNIT INCLUDING THE SAME AND IMAGE DISPLAY DEVICE INCLUDING THE SAME

(71) Applicant: DONGWOO FINE-CHEM CO., LTD., Jeollabuk-do (KR)

(72) Inventors: Cheol Hun Lee, Gyeonggi-do (KR); Do Hyoung KWon, Gyeonggi-do (KR); Sung Jin Noh, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 0 days.

(21) Appl. No.: 17/883,702

(22) Filed: Aug. 9, 2022

(65) Prior Publication Data
US 2023/0037537 A1 Feb. 9, 2023

(30) Foreign Application Priority Data
Aug. 9, 2021 (KR) .................. 10-2021-0104329

(51) Int. Cl.
*G02F 1/1335* (2006.01)
*G02F 1/13357* (2006.01)

(52) U.S. Cl.
CPC .. *G02F 1/133612* (2021.01); *G02F 1/133603* (2013.01); *G02F 1/133608* (2013.01)

(58) Field of Classification Search
CPC ......... G02F 1/133612; G02F 1/133603; G02F 1/133608
See application file for complete search history.

(56) References Cited

U.S. PATENT DOCUMENTS

| | | | | |
|---|---|---|---|---|
| 2007/0080438 A1* | 4/2007 | Yamanaka | ............ | H01L 23/147 257/E23.008 |
| 2012/0294042 A1* | 11/2012 | Sung | .................... | H05K 1/0204 362/612 |
| 2018/0180249 A1* | 6/2018 | Yamada | ................ | H01L 33/505 |

FOREIGN PATENT DOCUMENTS

| KR | 10-0755615 B1 | 9/2007 |
|---|---|---|
| KR | 10-1303188 B1 | 9/2013 |

* cited by examiner

*Primary Examiner* — Karabi Guharay
(74) *Attorney, Agent, or Firm* — The PL Law Group, PLLC

(57) ABSTRACT

A circuit board for a light-emitting diode assembly according to an embodiment includes a substrate layer having a first surface and a second surface facing each other, a conductive circuit layer disposed on the first surface of the substrate layer and having a single-layered structure, and an insulating layer formed on the first surface of the substrate layer to cover the conductive circuit layer. Channel resistance, luminous efficiency and luminous uniformity can be improved through a side connection of a dimming zone while vias or contacts are omitted.

17 Claims, 5 Drawing Sheets

CIRCUIT BOARD FOR LIGHT-EMITTING DIODE ASSEMBLY, BACKLIGHT UNIT INCLUDING THE SAME AND IMAGE DISPLAY DEVICE INCLUDING THE SAME

CROSS-REFERENCE TO RELATED APPLICATION AND CLAIM OF PRIORITY

This application claims the benefit under 35 USC § 119 of Korean Patent Application No. 10-2021-0104329 filed on Aug. 9, 2021 in the Korean Intellectual Property Office (KIPO), the entire disclosure of which is incorporated herein by reference for all purposes.

BACKGROUND

1. Field

The present invention relates to a circuit board for a light-emitting diode assembly, a backlight unit including the same and an image display device including the same. More particularly, the present invention relates to a circuit board for a light-emitting diode assembly including a substrate and a circuit wiring, a backlight unit including the same, and an image display device including the same.

2. Description of the Related Art

A cold cathode fluorescent lamp (CCFL) has been conventionally used as a backlight source of a liquid crystal display (LCD) device. However, the CCFL uses a mercury gas, and thus may cause environmental pollution and may be disadvantageous from aspects of a response speed and a color reproducibility. Further, the CCFL was disadvantageous in a fabrication of a thin LCD panel.

Accordingly, a light-emitting diode (LED) is being employed as the backlight source. The LED is an eco-friendly light source, and may provide a high-speed response and a color reproducibility with high-luminance. Additionally, luminance, color temperature, etc., may be adjusted by controlling a light-amount of red, green and blue LEDs, and the thin LCD panel with a compact size may be fabricated using the LED.

The LED light source may be mounted on a circuit board to define a backlight unit, and the backlight unit may be disposed under the LCD panel.

Landing pads on which a plurality of the LEDs are each mounted may be disposed on the circuit board, and wirings for a power supply to the landing pads and an operational control may be arranged.

As the large number of the landing pads are included in one circuit board, a uniform channel resistance may not be provided for each LED. Further, as disclosed in Korean Registered Patent Publication No. 10-1303188, when wirings are disposed on both surfaces of a circuit board, additional via holes or contacts are required to cause a degradation of an electrical circuit connection reliability.

SUMMARY

According to an aspect of the present invention, there is provided a circuit board for a light-emitting diode assembly providing improved electrical property and luminant efficiency.

According to an aspect of the present invention, there is provided a backlight unit providing improved electrical property and luminant efficiency.

According to an aspect of the present invention, there is provided an image display device including the backlight unit.

(1) A circuit board for a light-emitting diode assembly, including: a substrate layer having a first surface and a second surface facing each other; a conductive circuit layer disposed on the first surface of the substrate layer, the conductive circuit layer having a single-layered structure; and an insulating layer formed on the first surface of the substrate layer to cover the conductive circuit layer.

(2) The circuit board for a light-emitting diode assembly of the above (1), wherein the conductive circuit layer includes LED landing pads, a common wiring and individual wirings.

(3) The circuit board for a light-emitting diode assembly of the above (2), wherein the insulating layer includes an opening partially exposing each of the LED landing pads, and the insulating layer has a single-layered structure.

(4) The circuit board for a light-emitting diode assembly of the above (3), wherein the insulating layer entirely covers the common wiring and the individual wirings.

(5) The circuit board for a light-emitting diode assembly of the above (3), wherein the insulating layer includes a resist layer having a reflectance of 80% or more with respect to a visible light.

(6) The circuit board for a light-emitting diode assembly of the above (2), wherein dimming zones are defined by a predetermined number of LED landing pads among the LED landing pads, and the common wiring is commonly connected to a predetermined number of dimming zones among the dimming zones, and the individual wirings are each independently connected to each of the dimming zones.

(7) The circuit board for a light-emitting diode assembly of the above (6), wherein the common wiring and the individual wirings extend along lateral sides of the dimming zones and are connected to the LED landing pads through the lateral sides of the dimming zones.

(8) The circuit board for a light-emitting diode assembly of the above (6), wherein the conductive circuit layer further includes a common connection pad formed at a terminal end portion of the common wiring and individual connection pads formed at terminal end portions of the individual wirings.

(9) The circuit board for a light-emitting diode assembly of the above (8), wherein the common connection pad and the individual connection pads are located at the same layer as that of the LED landing pads.

(10) The circuit board for a light-emitting diode assembly of the above (6), further including a dummy electrode disposed in an empty space except for the LED landing pads in the dimming zones.

(11) The circuit board for a light-emitting diode assembly of the above (1), further including an intermediate layer formed between the conductive circuit layer and the substrate layer.

(12) The circuit board for a light-emitting diode assembly of the above (11), wherein the intermediate layer includes a plating seed layer, and the conductive circuit layer includes a metal plating layer.

(13) The circuit board for a light-emitting diode assembly of the above (11), wherein the intermediate layer includes an adhesive layer and the conductive circuit layer is formed from a metal foil.

(14) The circuit board for a light-emitting diode assembly of the above (11), further including a barrier conductive layer formed on the conductive circuit layer.

(15) The circuit board for a light-emitting diode assembly of the above (1), wherein a circuit or a conductive layer is not formed on the second surface of the substrate layer.

(16) The circuit board for a light-emitting diode assembly of the above (1), wherein the substrate layer includes a glass substrate, an organic polymer substrate or an inorganic insulating substrate.

(17) A backlight unit, including: the circuit board for a light-emitting diode assembly according to embodiments as described above; and light emitting diodes mounted on the circuit board for a light-emitting diode assembly.

(18) An image display device, including: the backlight unit according to embodiments as described above; and a liquid crystal panel disposed on the backlight unit.

In a circuit board for a light-emitting diode assembly according to embodiments of the present invention, circuit wirings may be distributed on only one surface of a substrate layer. In exemplary embodiments, LED landing pads forming a dimming block or a dimming zone, a common wiring commonly connected to a plurality of the dimming zones and an individual wiring connected to each of the dimming zones may all be distributed at the same layer or at the same level on the one surface of the substrate layer.

Accordingly, an increase of resistance due to a contact or via connection may be prevented, and improved electrical connection reliability may be achieved. Thus, desired high color reproducibility and high luminance may be effectively implemented from the dimming zone.

In some embodiments, the circuit wirings of the circuit board for a light emitting diode assembly may be formed of a copper plating layer or a copper foil layer. Thus, low-resistance circuit wirings may be formed in a thin single layer without an additional deposited layer.

DETAILED DESCRIPTION OF THE EMBODIMENTS

According to exemplary embodiments of the present invention, a circuit board for a light-emitting diode assembly including a single-layered conductive circuit layer is provided. According to exemplary embodiments of the present invention, a backlight unit and an image display device including the circuit board for a light-emitting diode assembly are also provided.

In exemplary embodiments, the circuit board for the light-emitting diode assembly may be a glass-based circuit board for a mini-LED assembly.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1A:
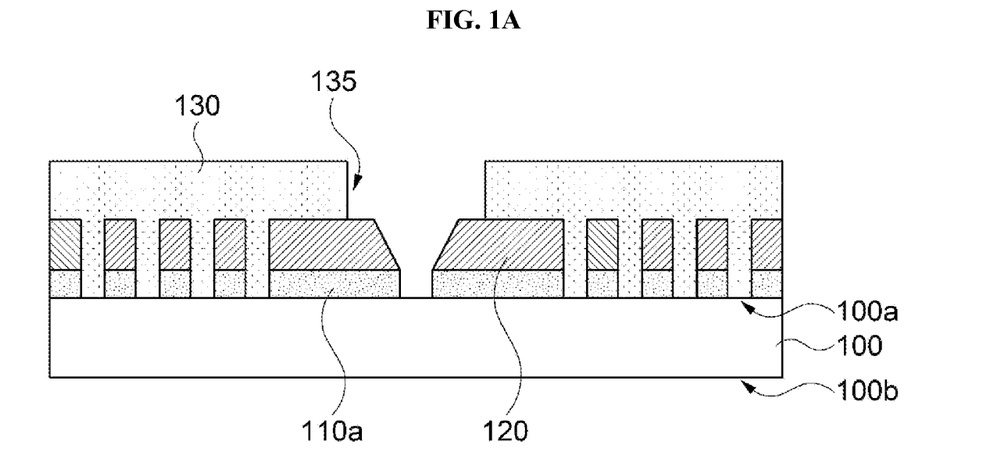
FIGS. 1A and 1B are schematic cross-sectional views illustrating a circuit board for a light-emitting diode assembly in accordance with exemplary embodiments.
Figure 1B:
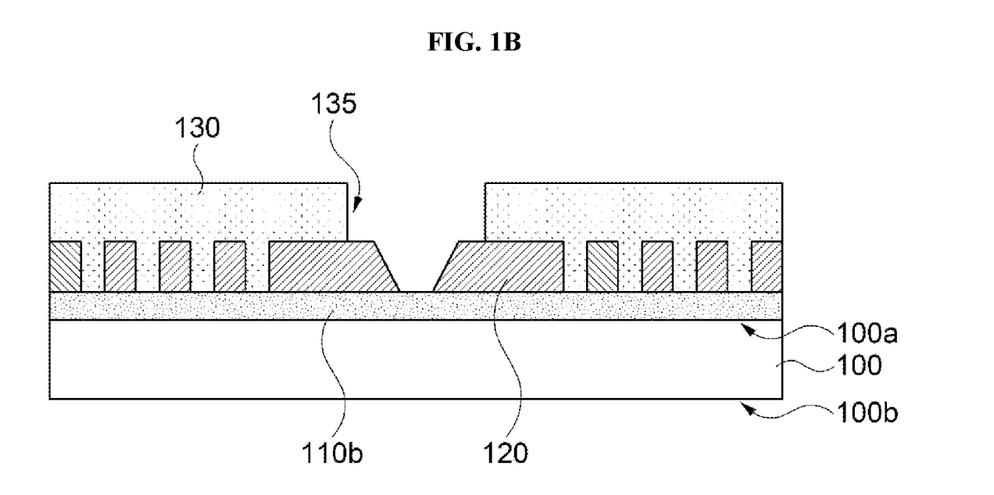

FIGS. 1A and 1B are schematic cross-sectional views illustrating a circuit board for a light-emitting diode assembly in accordance with exemplary embodiments.

Referring to FIGS. 1A and 1B, a circuit board for a light-emitting diode assembly (hereinafter, may be abbreviated as a circuit board) may include a substrate layer 100 and a conductive circuit layer 120 formed on one surface of the substrate layer 100. An insulating layer 130 including an opening 135 provided as a landing hole may be formed on the substrate layer 100.

The substrate layer 100 may include an insulating material used as a base substrate or a core layer of a printed circuit board. For example, the substrate layer 100 may include a transparent inorganic material or a transparent organic material. Preferably, the substrate layer 100 may be a glass substrate.

The substrate layer 100 may include a first surface 100a and a second surface 100b. The first surface 100a and the second surface 100b may face each other. For example, the first surface 100a and the second surface 100b may correspond to a top surface and a bottom surface of the substrate layer 100, respectively.

A conductive circuit layer 120 may be formed on the first surface 100a of the substrate layer 100. In exemplary embodiments, the conductive circuit layer 120 may be formed only on the first surface 100a of the substrate layer 100, and may not be formed on the second surface 100b.

Accordingly, the circuit board according to the exemplary embodiments may be provided as a substantially single-sided circuit board.

In some embodiments, the conductive circuit layer 120 may be formed as a substantially single layer. For example, a multi-layered circuit structure through a via or a contact may be excluded.

The conductive circuit layer 120 may include a metal such as copper (Cu), nickel (Ni), palladium (Pd), chromium (Cr), etc.

An intermediate layer 110a and 110b may be formed between the conductive circuit layer 120 and the first surface 100a of the substrate layer 100.

As illustrated in FIG. 1A, in some embodiments, the intermediate layer 110a may be a plating seed layer. In this case, the conductive circuit layer 120 may be a plated layer formed using the intermediate layer 110a as a seed.

For example, the intermediate layer 110a may include a metal such as titanium (Ti), copper (Cu), chromium (Cr), or palladium (Pd). The intermediate layer 110a may be formed by, e.g., an electroless plating or a deposition process.

In an embodiment, the intermediate layer 110a may include a copper seed layer, and the conductive circuit layer 120 may be a copper layer formed by an electrolytic plating using the copper seed layer.

For example, a thickness of the intermediate layer 110a formed of the plating seed layer may be from about 50 nm to 200 nm, and a thickness of the conductive circuit layer 120 formed of the plated layer may be from about 1 µm to 50 µm.

The intermediate layer 110a and the conductive circuit layer 120 may be patterned substantially together to form circuit patterns.

As illustrated in FIG. 1B, in some embodiments, the intermediate layer 110b may be an adhesive layer. In this case, the conductive circuit layer 120 may be formed from a metal foil, e.g., a copper foil. For example, the intermediate layer 110b and the conductive circuit layer 120 may be formed from a single-sided copper clad laminate (CCL) including the substrate layer 100. The intermediate layer 110b may be formed entirely on the first surface 100a of the substrate layer 100, and may be exposed between patterns of the conductive circuit layer 120.

For example, each thickness of the intermediate layer 110b formed from the adhesive layer and the conductive circuit layer formed from the copper foil may be from about 1 µm to 50 µm.

In some embodiments, the intermediate layer 110a and 110b may be in direct contact with the first surface 100a of the substrate layer 100. The conductive circuit layer 120 may be in direct contact with the intermediate layer 110a and 110b.

The insulating layer 130 partially covering the conductive circuit layer 120 may be formed on the first surface 100a of the substrate layer 100. In exemplary embodiments, the insulating layer 130 may serve as a solder resist (SR) layer for mounting a light-emitting diode (LED).

In some embodiments, the insulating layer 130 may be formed of a highly reflective material having a light reflectance of 80% or more. For example, the insulating layer 130 may have a reflectance of 80% or more with respect to a visible light. In an embodiment, the insulating layer 130 may have a reflectance of 80% or more with respect to a D65 light source among CIE standard light sources.

Accordingly, an LED light reflected from an upper portion of the backlight unit including the circuit board and re-incident to the circuit board may be reflected again. Thus, light efficiency in the backlight unit and the image display device may be improved.

Figure 2:
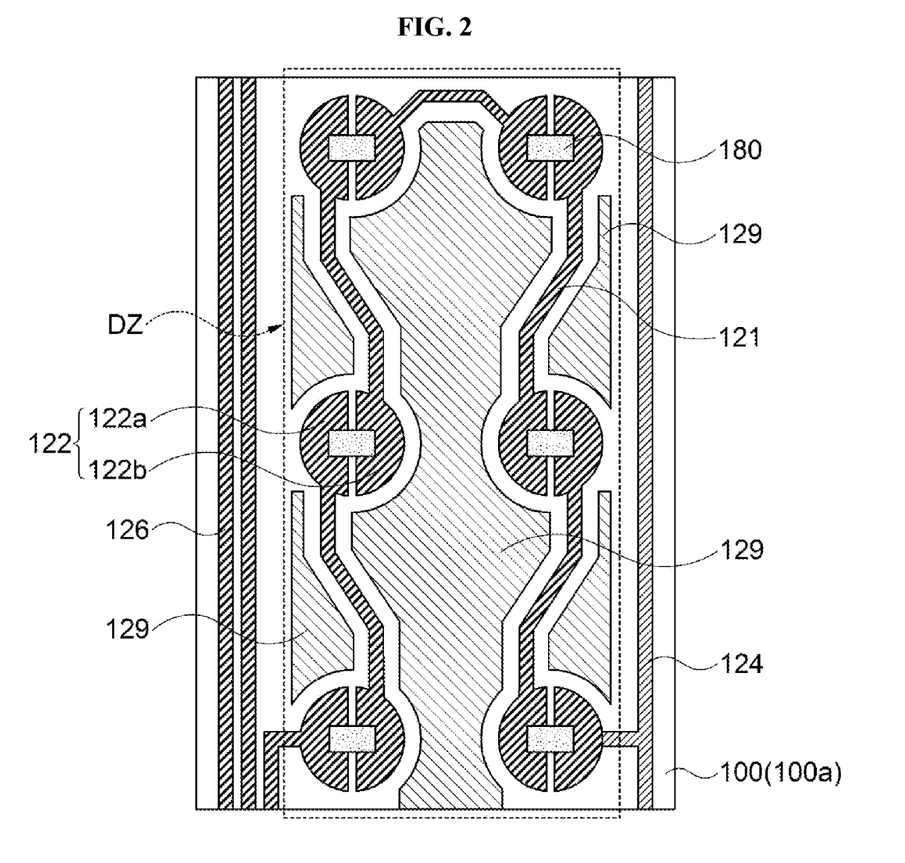
FIGS. 2 and 3 are schematic plan views illustrating LED landing pads and wirings included in a circuit board for a light-emitting diode assembly in accordance with exemplary embodiments.

The insulating layer 130 may include the opening 135 exposing the LED landing pad 122 (see FIG. 2). The LEDs may each be individually coupled or mounted on the LED landing pad 122 through the opening 135.

Figure 3:
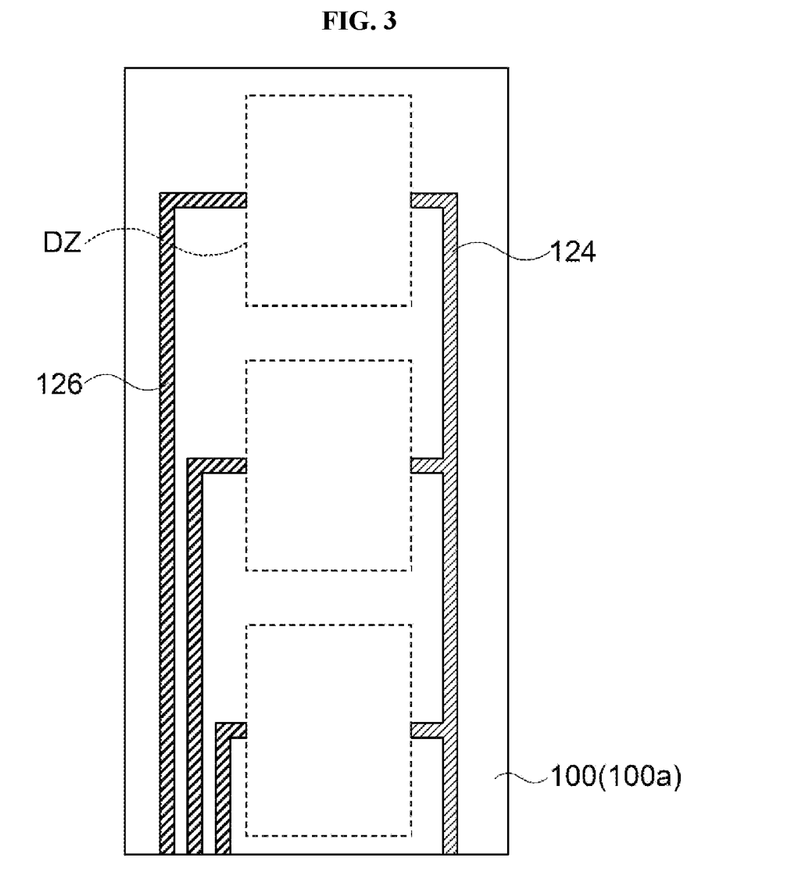

FIGS. 2 and 3 are schematic plan views illustrating LED landing pads and wirings included in a circuit board for a light-emitting diode assembly in accordance with exemplary embodiments.

Referring to FIGS. 2 and 3, the conductive circuit layer 120 may include the LED landing pad 122, a common wiring 124 and an individual wiring 126. The conductive circuit layer 120 may further include a connection wiring 121 connecting the adjacent LED landing pads 122 to each other.

The LED landing pad 122 may include a first landing pad 122a and a second landing pad 122b having different polarities. For example, the first and second landing pads 122a and 122b may have a semicircular shape, and linear side surfaces of the first and second landing pads 122a and 122b may face each other.

Each of light-emitting diodes 180 may be mounted on the LED landing pad 122. The light-emitting diode 180 may be connected to and extend across the first and second landing pads 122a and 122b having different polarities.

As described with reference to FIGS. 1A and 1B, the first and second landing pads 122a and 122b of the LED landing pad 122 may be partially exposed through the opening 135 of the insulating layer 130. Accordingly, the light-emitting diode 180 may be mounted on the circuit board through the opening 135.

The insulating layer 130 may entirely cover the common wiring 124, the individual wiring 126 and the connection wiring 121.

A predetermined number of the LED landing pads 122 may be connected by the connection wiring 121 to form a dimming zone DZ. The dimming zone DZ may serve as a light-emitting unit in a light-emitting diode assembly. For example, brightness and color of each of the dimming zones DZ may be individually controlled.

The number of the LED landing pads 122 included in one dimming zone DZ may be appropriately changed in consideration of a size of an image display device, a degree of integration of the light-emitting diodes, etc.

As illustrated in FIG. 3, a plurality of the dimming zones DZ may be arranged on the first surface 100a of the substrate layer 100. The dimming zones DZ may be repeatedly disposed along a row direction and a column direction of the substrate layer 100 to form an assembly or an array. For convenience of descriptions. detailed illustration of the LED landing pads 122 and the connection wiring 121 in the dimming zone DZ is omitted in FIG. 3.

The common wiring 124 may be commonly connected to a predetermined number of dimming zones DZ among the dimming zones DZ. The individual wirings 126 may be independently connected to each of the dimming zones DZ.

For example, the common wiring 124 may be provided as a cathode wiring of the circuit board. The individual wiring 126 may be provided as an anode wiring of a circuit board.

The common wiring 124 and the individual wirings 126 may be adjacent lateral sides of the dimming zones to extend in the column direction. The common wiring 124 and the individual wirings 126 may be connected to the LED landing pads 122 through the lateral side. Accordingly, as illustrated in FIG. 2, the common wiring 124 and the individual wirings 126 may be horizontally connected to the LED landing pads 122.

In some embodiments, as illustrated in FIG. 2, a dummy electrode 129 may be further included in the dimming zone DZ. For example, the dummy electrode 129 may be arranged in an empty space except for the LED landing pads 122. The dummy electrode 129 may be disposed between the wirings 124 and 126 adjacent to the dimming zone DZ and the LED landing pad 122 to function as a noise barrier.

Figure 4:
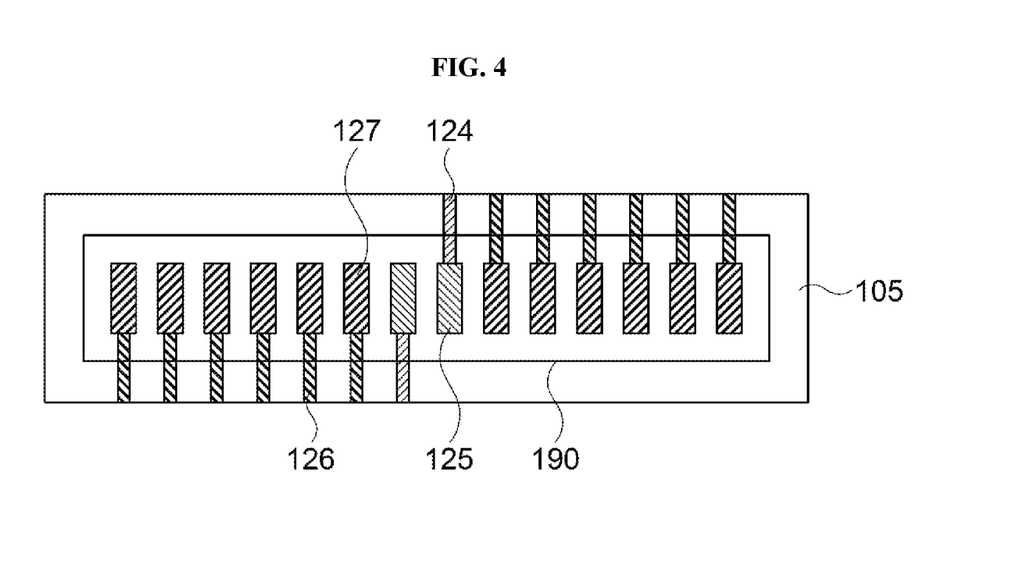
FIG. 4 is a schematic plan view illustrating connection pads included in a circuit board for a light-emitting diode assembly in accordance with exemplary embodiments.

FIG. 4 is a schematic plan view illustrating connection pads included in a circuit board for a light-emitting diode assembly in accordance with exemplary embodiments.

Referring to FIG. 4, one end portion of the substrate layer 100 may serve as an external connection region 105. For example, terminal end portions of the above-described wirings 124 and 126 may be assembled in the external connection region 105.

Connection pads may be connected to the terminal end portions of the wirings 124 and 126. A common connection pad 125 may be connected to a terminal end portion of the common wiring 124, and an individual connection pad 127 may be connected to a terminal end portion of the individual wiring 126. In an embodiment, the terminal end portions of the wirings 124 and 126 may serve as the connection pads 125 and 127.

An external circuit structure 190 may be electrically connected to the conductive circuit layer 120 via the external connection region 105. For example, the external circuit structure 190 may include a driving integrated circuit chip or an external power supply. The external circuit structure 190 may further include a connector. The external connection region 105 may serve as a bonding region for electrically connecting the external circuit structure 190 to the LED landing pads 122.

In an embodiment, the external circuit structure 190 may further include an intermediate circuit structure such as a flexible circuit board and a connector for connecting the circuit board and the driving integrated circuit.

The external circuit structure 190 may supply a common signal and an individual signal to the dimming zone DZ through the wirings 124 and 126 via the connection pads 125 and 127.

According to the above-described exemplary embodiments, all wirings or conductive patterns included in the circuit board may be arranged on the first surface 100*a* of the substrate layer 100, and may substantially form a single-layered circuit.

For example, the above-described LED landing pads 122, the common wiring 124, the individual wiring 126, the connection pads 125 and 127 and the dummy electrode 129 may all be disposed at the same layer or at the same level.

Figure 5:
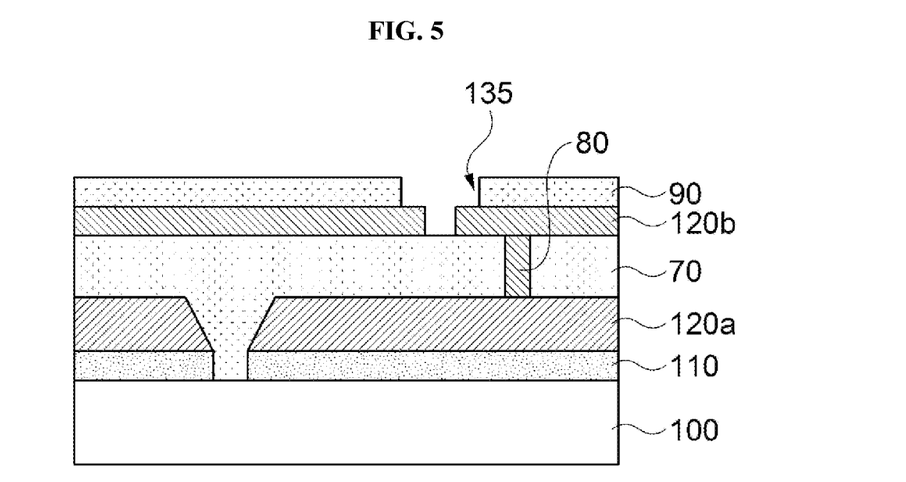
FIG. 5 is a schematic cross-sectional view illustrating a circuit board for a light-emitting diode assembly in accordance with a comparative example.

FIG. 5 is a schematic cross-sectional view illustrating a circuit board for a light-emitting diode assembly in accordance with a comparative example.

Referring to FIG. 5, a circuit board according to a comparative example may include a conductive circuit layer having a multi-layered structure formed on the substrate layer 100.

The conductive circuit layer includes a first conductive circuit layer 120*a* and a second conductive circuit layer 120*b*, and an insulating interlayer 70 may be formed between the first conductive circuit layer 120*a* and the second conductive circuit layer 120*b*.

The first conductive circuit layer 120*a* may include the above-described individual wiring. The second conductive circuit layer 120*b* may include the above-described LED landing pad, the common wiring and the connection wiring. The first and second conductive circuit layers 120*a* and 120*b* are electrically connected by a via structure 80 penetrating through the insulating interlayer 70.

A solder resist layer 90 is formed on the insulating interlayer 70 and includes an opening 135 partially exposing the LED landing pad of the second conductive circuit layer 120*b*.

According to the above-described comparative example, a thickness of the circuit board is increased by the conductive circuit layer having the multi-layered structure. Thus, a thickness of the backlight unit and the image display device are also increased. Further, the via structure 80 is included, and thus a channel length to the light emitting diode or the dimming zone may become greater to increase a channel resistance. As a result, an overall luminous efficiency and luminance may be deteriorated.

Additionally, the second conductive circuit layer 120*b* must be additionally formed, and thus the second conductive circuit layer 120*b* is formed by a deposition process such as a sputtering process. Accordingly, the resistance is additionally increased when compared to a case using a low-resistance metal foil such as a copper foil.

However, in the circuit board according to the above-described exemplary embodiments, the LED landing pad, the common wiring, the individual wiring and the connection pad may be arranged together in the conductive circuit layer of the single-layered structure. Accordingly, a channel length to each dimming zone DZ may be decreased while improving color reproducibility and luminance in the LED assembly.

Additionally, the channel resistance in the dimming zone DZ may be further reduced by implementing the overall circuit design using, e.g., the low-resistance copper foil or the plating.

In an embodiment, a sheet resistance of the conductive circuit layer 120 may be $0.01\Omega/\square$ or less, preferably $0.005\Omega/\square$ or less.

Figure 6:
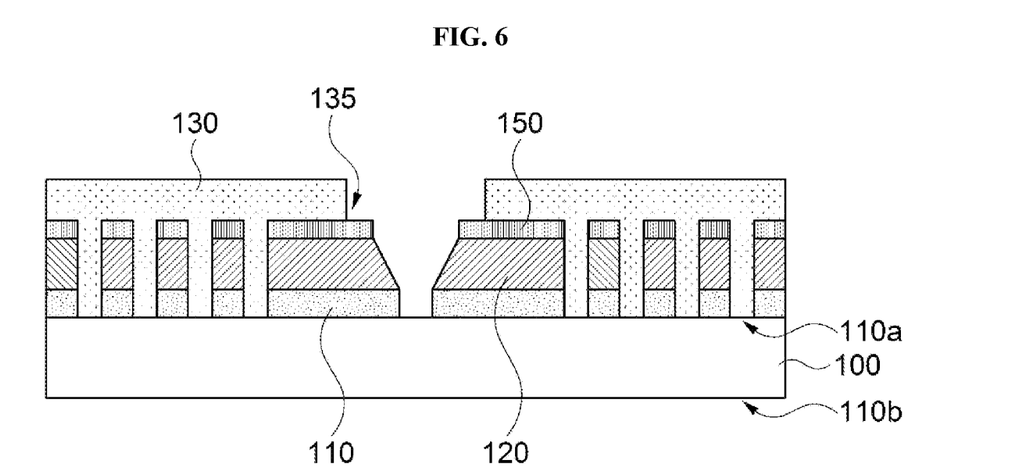
FIG. 6 is a schematic cross-sectional view illustrating a circuit board for a light-emitting diode assembly in accordance with exemplary embodiments.

FIG. 6 is a schematic cross-sectional view illustrating a circuit board for a light-emitting diode assembly in accordance with exemplary embodiments. Detailed descriptions of elements and structures substantially the same as or similar to those described with reference to FIGS. 1A to 3 are be omitted herein.

Referring to FIG. 6, a barrier conductive layer 150 may be formed on a top surface of the conductive circuit layer 120. The barrier conductive layer 150 may serve as a corrosion-resistant layer or an anti-rust layer, and may improve reliability of the LED landing pad 122 exposed through the opening 135. Further, an adhesion of the light emitting diode 180 may also be improved.

The barrier conductive layer 150 may be directly formed on the top surface of the conductive circuit layer 120. For example, the barrier conductive layer 150 may include nickel, chromium or an alloy thereof.

Figure 7:
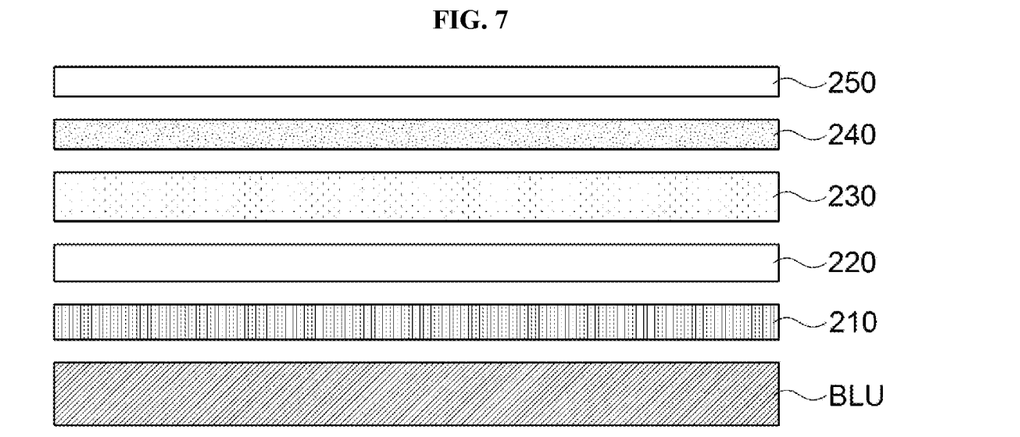
FIG. 7 is a schematic view illustrating a backlight unit and an image display device in accordance with exemplary embodiments.

FIG. 7 is a schematic view illustrating a backlight unit and an image display device in accordance with exemplary embodiments.

Referring to FIG. 7, as illustrated in FIG. 2, the light-emitting diodes 180 may be combined with the circuit board to define a backlight unit BLU. The backlight unit may be provided as a mini-LED BLU. In an embodiment, the backlight unit BLU may further include an optical film such as a light-guide plate or a diffusion plate.

The backlight unit BLU may be disposed under a TFT array substrate 220. A lower polarizing plate 210 may be disposed between the TFT array substrate 220 and the backlight unit BLU.

A liquid crystal cell 230 may be disposed on the TFT array substrate 220, and an LCD device to which a mini LED BLU according to exemplary embodiments is applied may be provided. A liquid crystal panel may be defined by the TFT array substrate 220 and the liquid crystal cell 230.

A color filter 240 may be disposed on the liquid crystal cell 230, and a cover glass 250 may be disposed on the color filter 240. An upper polarizing plate may be further disposed between the color filter 240 and the cover glass 250.

What is claimed is:

1. A circuit board for a light-emitting diode assembly, the circuit board comprising:
   a substrate layer having a first surface and a second surface facing each other;
   a conductive circuit layer disposed on the first surface of the substrate layer, the conductive circuit layer having a single-layered structure; and
   an insulating layer formed on the first surface of the substrate layer to cover the conductive circuit layer,
   wherein the conductive circuit layer comprises LED landing pads, a common wiring and individual wirings, and the insulating layer partially covers top surfaces of the LED landing pads.

2. The circuit board of claim 1, wherein the insulating layer includes an opening partially exposing each of the LED landing pads, and the insulating layer has a single-layered structure.

3. The circuit board of claim 2, wherein the insulating layer entirely covers the common wiring and the individual wirings.

4. The circuit board of claim 2, wherein the insulating layer includes a resist layer having a reflectance of 80% or more with respect to a visible light.

5. The circuit board of claim 1, wherein dimming zones are defined by a predetermined number of LED landing pads among the LED landing pads; and the common wiring is commonly connected to a predetermined number of dimming zones among the dimming zones, and the individual wirings are each independently connected to each of the dimming zones.

6. The circuit board of claim 5, wherein the common wiring and the individual wirings extend along lateral sides of the dimming zones and are connected to the LED landing pads through the lateral sides of the dimming zones.

7. The circuit board of claim 5, wherein the conductive circuit layer further comprises a common connection pad formed at a terminal end portion of the common wiring and individual connection pads formed at terminal end portions of the individual wirings.

8. The circuit board of claim 7, wherein the common connection pad and the individual connection pads are located at the same layer as that of the LED landing pads.

9. The circuit board of claim 5, further comprising a dummy electrode disposed in an empty space except for the LED landing pads in the dimming zones.

10. The circuit board of claim 1, further comprising an intermediate layer formed between the conductive circuit layer and the substrate layer.

11. The circuit board of claim 10, wherein the intermediate layer comprises a plating seed layer, and the conductive circuit layer comprises a metal plating layer.

12. The circuit board of claim 10, wherein the intermediate layer comprises an adhesive layer and the conductive circuit layer is formed from a metal foil.

13. The circuit board of claim 10, further comprising a barrier conductive layer formed on the conductive circuit layer.

14. The circuit board of claim 1, wherein a circuit or a conductive layer is not formed on the second surface of the substrate layer.

15. The circuit board of claim 1, wherein the substrate layer comprises a glass substrate, an organic polymer substrate or an inorganic insulating substrate.

16. A backlight unit, comprising:
the circuit board of claim 1; and
light emitting diodes mounted on the circuit board for a light-emitting diode assembly.

17. An image display device, comprising:
the backlight unit of claim 16; and
a liquid crystal panel disposed on the backlight unit.

* * * * *